US012637012B2

(12) United States Patent (10) Patent No.: US 12,637,012 B2
Paramo et al. (45) Date of Patent: May 26, 2026

(54) LOAD FLOOR FOLD OUT TABLE FOR VEHICLE

(71) Applicant: GM GLOBAL TECHNOLOGY OPERATIONS LLC, Detroit, MI (US)

(72) Inventors: Jose Roberto Paramo, Tlalnepantla de Baz (MX); Denise Valle, Estado de Mexico (MX); Joaquin Hidalgo, Toluca (MX); Juan Carlos Valencia, Chalco (MX); David Verburgt, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 380 days.

(21) Appl. No.: 18/351,879

(22) Filed: Jul. 13, 2023

(65) Prior Publication Data

US 2025/0018868 A1 Jan. 16, 2025

(51) Int. Cl.
*B60R 5/04* (2006.01)
*B60P 3/34* (2006.01)
(52) U.S. Cl.
CPC ................ *B60R 5/041* (2013.01); *B60P 3/34* (2013.01)
(58) Field of Classification Search
CPC .................................. B60R 5/041; B60P 3/34
USPC ...................................................... 296/26.11
See application file for complete search history.

(56) References Cited

U.S. PATENT DOCUMENTS

| | | | | |
|---|---|---|---|---|
| 3,010,760 A | * | 11/1961 | Trautmann ............... | B60J 5/103 296/37.16 |
| 3,976,209 A | * | 8/1976 | Burton .................... | B60P 1/435 52/645 |
| 4,580,828 A | * | 4/1986 | Jones ....................... | B60J 5/108 296/57.1 |
| 5,257,894 A | * | 11/1993 | Grant ...................... | B60P 1/431 414/537 |
| 6,343,908 B1 | * | 2/2002 | Oudsten ................. | A61G 3/061 414/921 |
| 6,378,927 B1 | * | 4/2002 | Parry-Jones ............ | B60P 1/435 296/61 |
| 6,447,040 B1 | * | 9/2002 | Young, Sr. ............. | B60P 1/435 296/61 |
| 12,258,075 B2 | * | 3/2025 | Rutman ................ | B60P 7/0815 |
| 2014/0356116 A1 | * | 12/2014 | Hermanson ............ | B60P 1/433 414/519 |
| 2018/0029515 A1 | | 2/2018 | Raines et al. | |

OTHER PUBLICATIONS

German Office Action for German Application No. 102023127383. 3; dated Aug. 13, 2024; 6 pages.

* cited by examiner

*Primary Examiner* — Joseph D. Pape
(74) *Attorney, Agent, or Firm* — CANTOR COLBURN LLP

(57) ABSTRACT

A platform assembly for a cargo zone of a vehicle includes a platform including one or more platform panels, and a platform hinge operably connected to a platform panel of the platform and secured to a body of the vehicle. The platform hinge is configured to move the platform between a stowed position inside the cargo zone to a deployed position at least partially outside of the cargo zone via rotation about a hinge axis of the platform hinge.

18 Claims, 4 Drawing Sheets

LOAD FLOOR FOLD OUT TABLE FOR VEHICLE

INTRODUCTION

The subject disclosure relates to vehicles, and more particularly to cargo area features of vehicles.

Most vehicles include cargo areas in which users may store, either on a temporary basis, or longer term, various items. Passenger vehicles include trunks that users rely upon to transport groceries, store spare tires, and the like. Pickup trucks include cargo beds that are used to transport items of various sizes. Sport utility vehicles (SUV's) include an enclosed cargo area that may be expanded by adjusting seat configurations. Many users of vehicles, such as SUV's seek to utilize the cargo area not only when driving or operating the vehicle, but also when the vehicle is parked at a campground, park, sporting event, or other location. Thus, an increase in features and flexibility of use of the cargo area would be welcomed.

SUMMARY

In one exemplary embodiment, a platform assembly for a cargo zone of a vehicle includes a platform including one or more platform panels, and a platform hinge operably connected to a platform panel of the platform and secured to a body of the vehicle. The platform hinge is configured to move the platform between a stowed position inside the cargo zone to a deployed position at least partially outside of the cargo zone via rotation about a hinge axis of the platform hinge.

In addition to one or more of the features described herein, the platform hinge is a double hinge, configured to allow for rotation of the platform about the hinge axis and movement of the platform vertically relative to the hinge axis.

In addition to one or more of the features described herein, the platform is configured to rotate 180 degrees about the hinge axis when moved between the stowed position and the deployed position via the platform hinge.

In addition to one or more of the features described herein, the one or more platform panels are two platform panels, and the platform assembly includes one or more panel hinges connecting a first panel of the two platform panels to a second panel of the two platform panels.

In addition to one or more of the features described herein, the one or more panel hinges are configured for rotation of the second panel relative to the first panel of 180 degrees.

In addition to one or more of the features described herein, rotation of the second panel relative to the first panel about a panel hinge axis defines a flat planar table surface including the first panel and the second panel.

In addition to one or more of the features described herein, a lock mechanism is included to retain the first panel and the second panel as the flat planar table surface.

In addition to one or more of the features described herein, a support strap is operably connected to the vehicle body and to the one or more platform panels and configured to support the one or more platform panels in the deployed position.

In addition to one or more of the features described herein, a handle is operably connected to the one or more platform panels and is configured to aid a user in moving the one or more platform panels between the stowed position and the deployed position.

In addition to one or more of the features described herein, when in the stowed position, the one or more platform panels are located beneath a load floor of the cargo zone.

In another exemplary embodiment, a vehicle includes a vehicle body defining a passenger zone and a cargo zone, the cargo zone including a load floor therein. The vehicle further includes a platform assembly including a platform having one or more platform panels, and a platform hinge operably connected to a platform panel of the platform and secured to the body of the vehicle. The platform hinge is configured to move the platform between a stowed position inside the cargo zone to a deployed position at least partially outside of the cargo zone via rotation about a hinge axis of the platform hinge.

In addition to one or more of the features described herein, the platform hinge is a double hinge, configured to allow for rotation of the platform about the hinge axis and movement of the platform vertically relative to the hinge axis.

In addition to one or more of the features described herein, the platform is configured to rotate 180 degrees about the hinge axis when moved between the stowed position and the deployed position via the platform hinge.

In addition to one or more of the features described herein, the one or more platform panels are two platform panels, and the platform assembly includes one or more panel hinges connecting a first panel of the two platform panels to a second panel of the two platform panels.

In addition to one or more of the features described herein, the one or more panel hinges are configured for rotation of the second panel relative to the first panel of 180 degrees.

In addition to one or more of the features described herein, rotation of the second panel relative to the first panel about a panel hinge axis defines a flat planar table surface including the first panel and the second panel.

In addition to one or more of the features described herein, a lock mechanism retains the first panel and the second panel as the flat planar table surface.

In addition to one or more of the features described herein, a support strap is operably connected to the vehicle body and to the one or more platform panels and is configured to support the one or more platform panels in the deployed position.

In addition to one or more of the features described herein, a handle is operably connected to the one or more platform panels and is configured to aid a user in moving the one or more platform panels between the stowed position and the deployed position.

In addition to one or more of the features described herein, when in the stowed position, the one or more platform panels are located beneath the load floor of the cargo zone.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
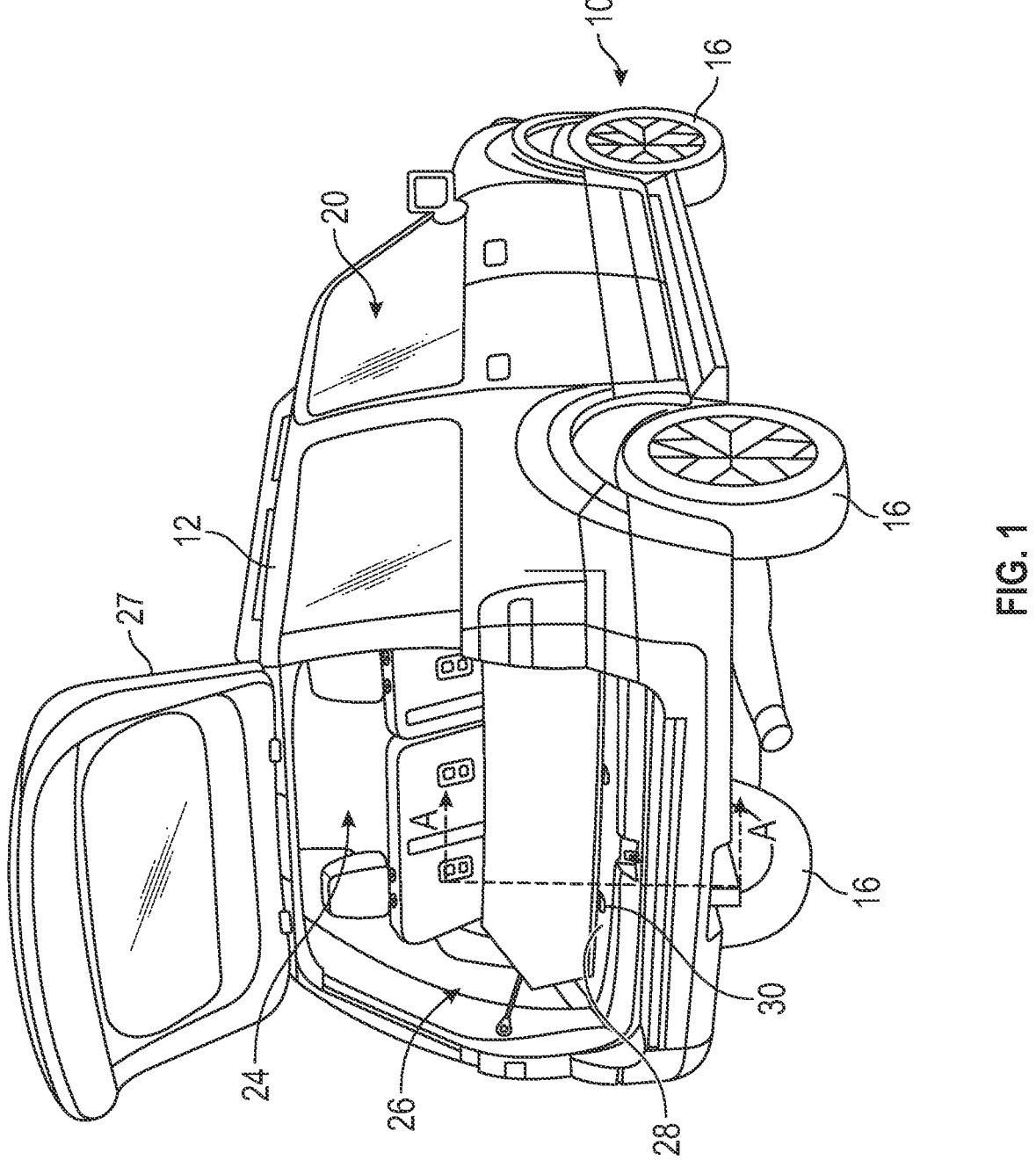
FIG. 1 is a schematic illustration of an embodiment of a vehicle.

The following description is merely exemplary in nature and is not intended to limit the present disclosure, its application or uses. It should be understood that throughout the drawings, corresponding reference numerals indicate like or corresponding parts and features.

Figure 2:
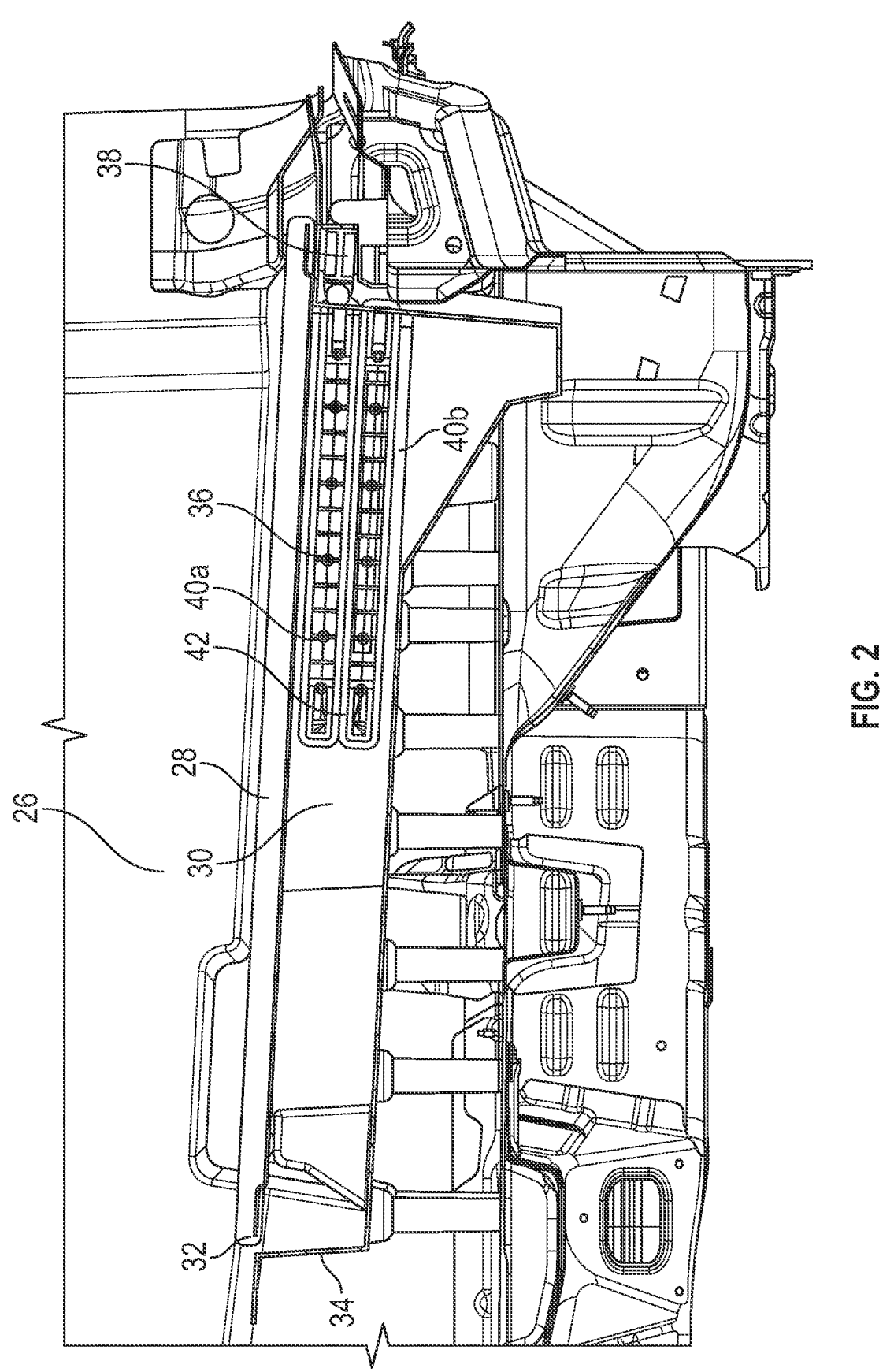
FIG. 2 is a partial cross-sectional view taken along A-A of FIG. 1 of an embodiment of a platform in a stowed position.

A vehicle, in accordance with a non-limiting example, is indicated generally at 10 in FIGS. 1 and 2. Vehicle 10 is shown in the form of a sport utility vehicle (SUV). It should however be understood that vehicle 10 is not limited to the particular body type shown and could take on various other forms including passenger vehicles, pickup trucks, vans, and the like. Vehicle 10 includes a body 12 supported on a plurality of wheels, three of which are indicated at 16. Body 12 defines a passenger compartment 20 including a passenger area 24 and a cargo zone 26 that is accessed via a hatch 27.

Cargo zone 26 includes a floor 28, that serves as a cover over a storage bin 30 defined in the body 12 and located beneath the floor 28. The floor 28 is movable between a closed position such as shown in FIG. 2, and an open position allowing access to the storage bin 30. In some embodiments, the movement is achieved utilizing one or more floor hinges 32 connecting the floor 28 and, for example, a bin wall 34 of the storage bin 30.

A deployable platform 36 is stored in the storage bin 30. The platform 36 is stored in the storage bin 30 in a stowed configuration, such as illustrated in FIG. 2. The platform 36 is positioned in the vehicle 10 via a platform hinge 38 secured to the platform 36 and to the body 12. In some embodiments, the platform hinge 38 is formed from one or more cast components, but one skilled in the art will readily appreciate that in other embodiments the platform hinge 38 components may be formed from other materials or processes. For example, the platform hinge 38 components may be formed from machined metal, such as aluminum, or may be molded plastic materials, which may or may not be fiber reinforced.

In some embodiments, the platform 36 includes a plurality of panels 40a and 40b connected to each other via a panel hinge 42. In the embodiment of FIG. 2, the platform hinge 38 is connected to a first panel 40a of the plurality of panels 40, and a second panel 40b of the plurality of panels 40 is connected to the first panel 40a via the panel hinge 42. While two panels 40 are illustrated and described herein, one skilled in the art will readily appreciate that additional panels 40 may be included in the platform 36, connected to each other via additional panel hinges 42. In some embodiments, the panels 40 are formed from a lightweight metal structure, such as an aluminum extrusion, which may be wrapped or overmolded with a material such as a plastic or fabric material, or a combination of a plastic and fabric material, such as a fabric cover applied over a plastic layer.

Figure 3:
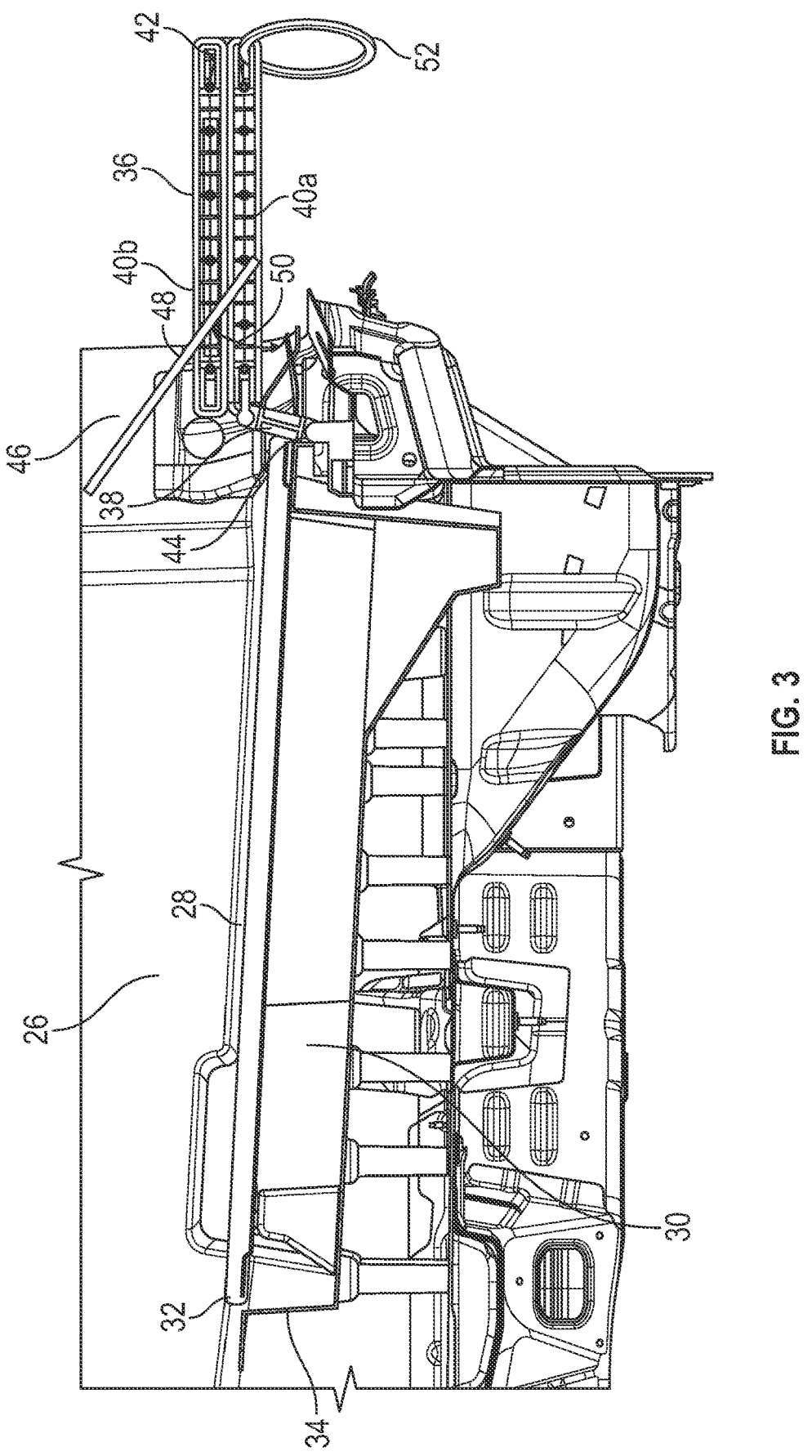
FIG. 3 is a partial cross-sectional view taken along A-A of FIG. 1 of an embodiment of a platform in a first deployed position.

FIG. 3 illustrates the platform 36 in a first deployed position, or bench position. To move to the bench position from the stowed position (illustrated in FIG. 2) when the hatch 27 is in an opened position, the platform hinge 38 is a double hinge, which guides the platform 36 through a 180 degree rotation about a platform hinge axis 44 and also lifts the platform 36 vertically such that the platform 36 then extends out of a hatch opening 46. In the bench position, the first panel 40a is located vertically beneath the second panel 40b, and supports the second panel 40b. The platform 36 may include a handle 52 secured to the platform 36 to aid a user in moving the platform 36 to the bench position. The handle 52 may, in some embodiments, be a strap or loop as shown, or alternatively may be, for example, a recess or other structure formed in one of the panels 40 of the platform 36. When the platform 36 is in the bench position, the platform 36 may be supported by a support strap 48 extending from the first panel 40a toward the body 12 and secured to the body 12. In some embodiments, the support strap 48 extends at a support angle 50 of, in some embodiments, 45 degrees. In some embodiments, the support strap 48 is formed from a braided wire or cable, or may alternatively be a molded plastic strap.

Figure 4:
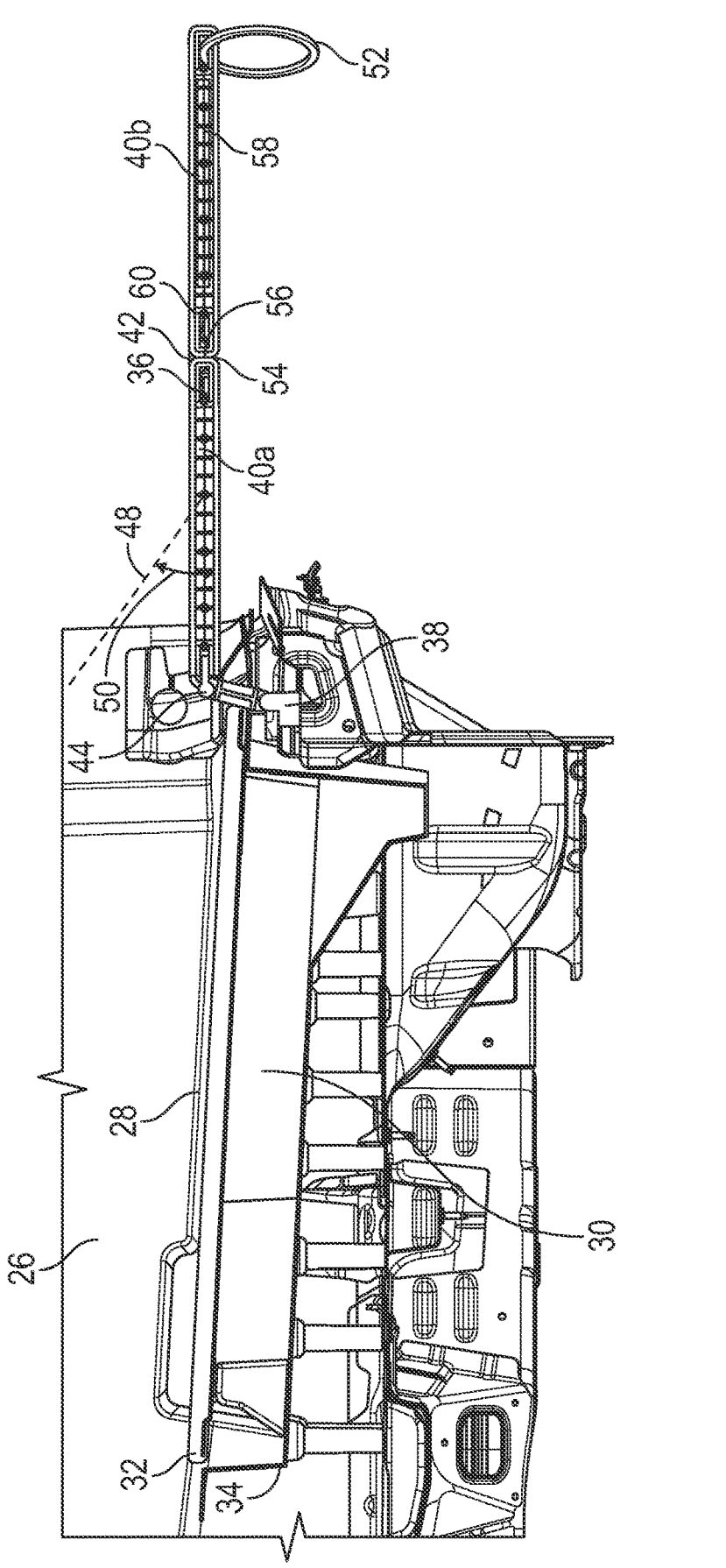
FIG. 4. is a partial cross-sectional view taken along A-A of FIG. 1 of an embodiment of a platform in a second deployed position.

Referring now to FIG. 4, the platform 36 may additionally be moved from the bench position to a table position, in which the second platform 40b is rotated 180 degrees about a panel hinge axis 54 utilizing the one or more panel hinges 42. In the table position, the first platform 40a and the second platform 40b are at substantially the same vertical height. In some embodiments, the one or more panel hinges 42 are recessed in a panel gap 56 between the panels 40a, 40b, to provide a substantially flat table surface for the user. The panels 40a, 40b, include a locking mechanism, such as a movable slide 58 and pin 60 apparatus that are adjustable to support loads on the platform 36 when the panels 40a and 40b are in the table position, and to lock the panels 40a and 40b in the table position.

The platform 36 configurations disclosed herein provides users with a stowable bench or table that is stowable beneath the load floor of the vehicle, thus not reducing an amount of available storage space in the cargo area, or without interfering with storage of other items in the cargo area. The platform 36 is easily deployable using the platform hinge and the one or more panel hinges. The platform may improve the user's enjoyment of the vehicle.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A platform assembly for a cargo zone of a vehicle, comprising:
   a platform including one or more platform panels; and
   a platform hinge operably connected to a platform panel of the platform and secured to a body of the vehicle, the platform hinge configured to move the platform between a stowed position inside the cargo zone to a deployed position at least partially outside of the cargo zone via rotation about a hinge axis of the platform hinge;
   wherein the platform hinge is a double hinge secured to the platform panel at a first hinge end and secured to the body at the second hinge end, the platform hinge configured to allow for rotation of the platform about the hinge axis and movement of the platform vertically relative to the hinge axis.

2. The platform assembly of claim 1, wherein the platform is configured to rotate 180 degrees about the hinge axis when moved between the stowed position and the deployed position via the platform hinge.

3. The platform assembly of claim 1, wherein:
   the one or more platform panels comprise two platform panels; and
   the platform assembly includes one or more panel hinges connecting a first panel of the two platform panels to a second panel of the two platform panels.

4. The platform assembly of claim 3, wherein the one or more panel hinges are configured for rotation of the second platform panel relative to the first platform panel of 180 degrees.

5. The platform assembly of claim 3, wherein rotation of the second panel relative to the first panel about a panel hinge axis defines a flat planar table surface including the first panel and the second panel.

6. The platform assembly of claim 5, further comprising a lock mechanism to retain the first panel and the second panel as the flat planar table surface.

7. The platform assembly of claim 1, further comprising a support strap operably connected to the vehicle and to the one or more platform panels and configured to support the one or more platform panels in the deployed position.

8. The platform assembly of claim 1, further comprising a handle operably connected to the one or more platform panels and configured to aid a user in moving the one or more platform panels between the stowed position and the deployed position.

9. The platform assembly of claim 1, wherein when in the stowed position, the one or more platform panels are disposed beneath a load floor of the cargo zone.

10. A vehicle, comprising:
   a vehicle body defining a passenger zone and a cargo zone, the cargo zone including a load floor therein;
   a platform assembly including:
      a platform including one or more platform panels; and
      a platform hinge operably connected to a platform panel of the platform and secured to the vehicle body, the platform hinge configured to move the platform between a stowed position inside the cargo zone to a deployed position at least partially outside of the cargo zone via rotation about a hinge axis of the platform hinge;
      wherein the platform hinge is a double hinge secured to the platform panel at a first hinge end and secured to the body at the second hinge end, the platform hinge configured to allow for rotation of the platform about the hinge axis and movement of the platform vertically relative to the hinge axis.

11. The vehicle of claim 10, wherein the platform is configured to rotate 180 degrees about the hinge axis when moved between the stowed position and the deployed position via the platform hinge.

12. The vehicle of claim 10, wherein:
   the one or more platform panels comprise two platform panels; and
   the platform assembly includes one or more panel hinges connecting a first panel of the two platform panels to a second panel of the two platform panels.

13. The vehicle of claim 12, wherein the one or more panel hinges are configured for rotation of the second panel relative to the first panel of 180 degrees.

14. The platform assembly of claim 12, wherein rotation of the second panel relative to the first panel about a panel hinge axis defines a flat planar table surface including the first panel and the second panel.

15. The vehicle of claim 14, further comprising a lock mechanism to retain the first panel and the second panel as the flat planar table surface.

16. The vehicle of claim 10, further comprising a support strap operably connected to the vehicle body and to the one or more platform panels and configured to support the one or more platform panels in the deployed position.

17. The vehicle of claim 10, further comprising a handle operably connected to the one or more platform panels and configured to aid a user in moving the one or more platform panels between the stowed position and the deployed position.

18. The vehicle of claim 10, wherein when in the stowed position, the one or more platform panels are disposed beneath the load floor of the cargo zone.

* * * * *